United States Patent
Jing et al.

(10) Patent No.: US 10,054,821 B2
(45) Date of Patent: Aug. 21, 2018

(54) RUBBING MURA DETECTION DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yangkun Jing, Beijing (CN); Guofang Sun, Beijing (CN); Chuanhui Chen, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 156 days.

(21) Appl. No.: 15/184,167

(22) Filed: Jun. 16, 2016

(65) Prior Publication Data

US 2016/0371832 A1  Dec. 22, 2016

(30) Foreign Application Priority Data

Jun. 19, 2015  (CN) .......................... 2015 1 0346118

(51) Int. Cl.
  *G02F 1/1337*  (2006.01)
  *H04N 5/33*    (2006.01)
  *H04N 5/225*   (2006.01)

(52) U.S. Cl.
  CPC .. *G02F 1/133723* (2013.01); *G02F 1/133784* (2013.01); *H04N 5/33* (2013.01); *H04N 5/2256* (2013.01)

(58) Field of Classification Search
  CPC ........ G02F 1/133723; G02F 1/133784; H04N 5/33; H04N 5/2256
  See application file for complete search history.

(56) References Cited

U.S. PATENT DOCUMENTS 4,578,584 A    3/1986  Baumann et al.
5,532,488 A *  7/1996  Ishibashi ................ G01N 21/21
                                                  250/341.3

(Continued)

FOREIGN PATENT DOCUMENTS

CN    202548061 U    11/2012
CN    103257465 A     8/2013

(Continued)

OTHER PUBLICATIONS

Studies on Experiments for Detecting Material Surface Defects by an Infrared Radiation Detector, (1994) China Academic Journal Electronic Publishing House, (pp. 40-42).

(Continued)

*Primary Examiner* — Brian Yenke
(74) *Attorney, Agent, or Firm* — Harness, Dickey & Pierce, P.L.C.

(57) ABSTRACT

A rubbing mura detection device is provided, including an infrared imaging unit used to acquire an infrared thermogram of a surface of the substrate, on which the alignment film is provided; and a rubbing mura detection unit used to detect whether or not the alignment film has the rubbing mura in accordance with an infrared radiation brightness temperature distribution in the infrared thermogram.

12 Claims, 2 Drawing Sheets

(56) References Cited

U.S. PATENT DOCUMENTS

| | | | | |
|---|---|---|---|---|
| 5,917,935 | A * | 6/1999 | Hawthorne | G02F 1/1303 348/126 |
| 5,991,038 | A * | 11/1999 | Yamamoto | G01B 11/306 356/237.2 |
| 6,154,561 | A * | 11/2000 | Pratt | G06T 7/001 345/904 |
| 7,911,498 | B2 * | 3/2011 | Shen | G09G 3/2007 348/177 |
| 8,160,351 | B2 * | 4/2012 | Sandstrom | G01N 21/956 356/237.4 |
| 8,582,207 | B2 * | 11/2013 | Fukuda | C08J 7/047 349/112 |
| 8,743,215 | B1 * | 6/2014 | Lee | G09G 3/006 348/180 |
| 8,786,851 | B2 * | 7/2014 | Kim | G01B 11/16 356/237.1 |
| 9,001,097 | B2 * | 4/2015 | Al-Dahle | G09G 3/006 345/207 |
| 9,766,500 | B2 * | 9/2017 | Dong | G02F 1/133784 |
| 2001/0024277 | A1 * | 9/2001 | Hirosawa | G01N 21/211 356/369 |
| 2003/0151008 | A1 * | 8/2003 | Yamada | G01N 21/8901 250/559.45 |
| 2004/0213449 | A1 * | 10/2004 | Safaee-Rad | G06T 7/0004 382/141 |
| 2005/0007364 | A1 * | 1/2005 | Oyama | G02F 1/1309 345/428 |
| 2005/0041243 | A1 * | 2/2005 | Choo | G01N 21/23 356/239.1 |
| 2005/0220330 | A1 * | 10/2005 | Kobayashi | G01N 21/956 382/141 |
| 2005/0271262 | A1 * | 12/2005 | Yoshida | G03F 1/84 382/149 |
| 2005/0280805 | A1 * | 12/2005 | Murai | G01N 21/956 356/237.1 |
| 2005/0286753 | A1 * | 12/2005 | Ho | G06T 7/001 382/141 |
| 2006/0158642 | A1 * | 7/2006 | Tanaka | G01N 21/956 356/237.5 |
| 2006/0158643 | A1 * | 7/2006 | Yoshida | G01N 21/956 356/237.5 |
| 2006/0203246 | A1 * | 9/2006 | Nakajima | G01N 21/896 356/430 |
| 2006/0222764 | A1 * | 10/2006 | Huang | G02F 1/133784 427/162 |
| 2007/0236686 | A1 * | 10/2007 | Kishioka | G01N 21/21 356/150 |
| 2011/0109910 | A1 * | 5/2011 | Georgakoudi | G01N 21/21 356/446 |
| 2015/0092814 | A1 * | 4/2015 | Wolfgruber | G01J 5/02 374/121 |
| 2016/0343123 | A1 * | 11/2016 | Jing | G02F 1/13 |
| 2017/0106409 | A1 * | 4/2017 | Jing | B05D 3/067 |

FOREIGN PATENT DOCUMENTS

| | | |
|---|---|---|
| CN | 103278945 A | 9/2013 |
| CN | 103454790 A | 12/2013 |
| CN | 103472625 A | 12/2013 |
| CN | 103676244 A | 3/2014 |
| CN | 103676284 A | 3/2014 |
| CN | 104317077 A | 1/2015 |
| CN | 104463835 A | 3/2015 |

OTHER PUBLICATIONS

First Office Action regarding Chinese Application No. 201510346118.4, dated Feb. 27, 2017. Translation provided by Dragon Intellectual Property Law Firm.

Second Office Action regarding Chinese Application No. 201510346118.4, dated Aug. 1, 2017. Translation provided by Dragon Intellectual Property Law Firm.

* cited by examiner

RUBBING MURA DETECTION DEVICE

CROSS-REFERENCE TO RELATED APPLICATION

The present application claims a priority of the Chinese patent application No. 201510346118.4 filed on Jun. 19, 2015, which is incorporated herein by reference in its entirety.

TECHNICAL FIELD

The present disclosure relates to the field of rubbing mura detection technologies, in particular, to a rubbing mura detection device.

BACKGROUND

Alignment films are arranged on an array substrate and a color filter substrate of a thin film transistor liquid crystal display (TFT-LCD) respectively, and each alignment film is provided with grooves each extending in a certain direction, so that liquid crystal molecules are aligned along the groove extension direction when no electric field is applied. Usually, a polyimide (PI) film coated and cured on a glass substrate is rubbed using a rubbing cloth wrapped onto a rubbing roller, so as to provide a surface of the PI film with the grooves each extending in a predetermined direction. Here, the PI film becomes the alignment film having alignment function.

During the manufacture of the alignment film, due to the possible defects of the rubbing cloth, e.g., an uneven thickness, a foreign matter attached onto a surface thereof or impurities introduced during a weaving and dyeing procedure, deviations (i.e., rubbing mura) may occur for the resultant grooves on the alignment film in terms of direction, shape and depth, and therefore the alignment performance will be adversely affected. Hence, after the manufacture of the alignment film, it is necessary to detect whether or not the grooves on the alignment are defective.

In the related technologies, usually the following approach is adopted to detect whether or not the grooves on the alignment film are defective. Steam is sprayed onto the surface of the alignment film on the glass substrate by a steam sprayer (usually held by an operator), so as to generate water beads on surfaces of the grooves. Then, a region of the alignment film where the steam is sprayed is irradiated by an accent lamp, and the grooves are observed by human eyes so as to determine whether or not there is a defect. To be specific, a light beam is diffused in case of transmitting through a portion of the groove where the defect is located, and in the case that the defect is a linear mura, a bright line can be observed.

After the defect of the groove has been detected, usually a scale is used to measure a position of the defect. Upon artificial conversion, an approximate position of the defect on the rubbing cloth may be found, and then a region of the rubbing cloth where the defect is located may be repaired. Next, a new rubbing process is performed and the above steam-based detection approach is used to determine whether or not the groove of the alignment film still has the defect, thereby determining whether or not the defect of the rubbing cloth has been removed.

However, during the actual application, there are the following drawbacks in the steam-based detection approach.

Firstly, in the case that the steam is sprayed onto the glass substrate and the surface of the alignment film to generate the water beads, the water beads may gradually disappear due to air flow or evaporation. In this regard, it is necessary to spray the steam continuously within a long time during the detection, and the detection efficiency is relatively low.

Secondly, the defect of the groove on the alignment film is detected artificially, so the detection efficiency is relatively low. In addition, different operators may have different detection results due to their different standards in observing.

Thirdly, the steam sprayer is held by the operator, and in the case that the glass substrate and the alignment film are each of a large size, the steam may not be sprayed onto some regions thereof. At this time, it is impossible to determine whether or not defects exist in these regions.

Fourthly, the steam sprayer is usually connected to a water tank that is heated to generate the steam. In the case that a water level in the water tank is relatively high, some water beads in the water tank may be sputtered through the steam sprayer onto the alignment film. At this time, a subsequent process will be adversely affected.

Fifthly, along with the increase in the resolution of the TFT-LCD, the grooves on the alignment film are required to be smaller and smaller. Due to the poor homogeneity of the water beads on the surfaces of the glass substrate and the alignment film as well as limitations of observation by the human eyes, it is impossible for the steam-based detection approach to meet the requirements of detection of the alignment film of the high-resolution TFT-LCD.

Moreover, the above steam-based detection approach is performed artificially, and after the defect of the groove on the alignment film has been detected, it is usually impossible to acquire the position of the defect on the rubbing cloth accurately through the artificial conversion. In this regard, the defect on the rubbing cloth may not be removed merely through a single positioning and repairing process, i.e., several positioning and repairing processes are required. In addition, in the case that the defect on the rubbing clock is not removed through several positioning and repairing processes yet, a new rubbing cloth needs to be used. As a result, a large quantity of manpower and material resources will be consumed, and utilization of the production line will be reduced.

SUMMARY

A rubbing mura detection device is provided in the present disclosure, which effectively detects a passive infrared image of a rubbing mura and overcomes the drawbacks caused by the inhomogeneity of the water beads in the conventional steam-based detection approach.

The present disclosure provides in some embodiments a rubbing mura detection device for detecting rubbing mura of an alignment film on a substrate, including: an infrared imaging unit used to acquire an infrared thermogram of a surface of the substrate, on which the alignment film is provided; and a rubbing mura detection unit used to detect whether or not the alignment film has the rubbing mura in accordance with an infrared radiation brightness temperature distribution in the infrared thermogram.

Optionally, the infrared imaging unit includes an infrared light source used to emit infrared light beams toward the surface of the substrate on which the alignment film is provided, and an imaging unit used to generate the infrared thermogram in accordance with collected infrared light beams which are reflected by the surface of the substrate on which the alignment film is provided.

Optionally, the substrate includes a first side edge and a second side edge each extending in a first direction, and a third side edge and a fourth side edge each extending in a second direction perpendicular to the first direction. The infrared light source includes multiple infrared light emitting elements used to emit, at predetermined angles, the infrared light beams toward the surface of the substrate on which the alignment film is provided. The imaging unit includes multiple infrared light receiving elements used to receive the infrared light beams reflected by the surface of the substrate on which the alignment film is provided, to form the infrared thermogram. The multiple infrared light emitting elements are arranged in the second direction above the surface of the substrate on which the alignment film is provided and are capable of moving synchronously in the first direction. The multiple infrared light receiving units are arranged in the second direction above the surface of the substrate on which the alignment film is provided and are capable of moving synchronously in the first direction.

Optionally, each infrared light receiving unit includes a lens facing the surface of the substrate on which the alignment film is provided, so as to receive the infrared light beams reflected by the surface of the substrate on which the alignment film is provided.

Optionally, the rubbing mura detection device further includes an infrared light emitting element bracket capable of moving along the first side edge and the second side edge, and an infrared light receiving element bracket capable of moving along the first side edge and the second side edge. The infrared light emitting element bracket includes a beam arranged in the second direction above the surface of the substrate on which the alignment film is provided, the multiple infrared light emitting elements are arranged sequentially on the beam, and two ends of the beam are connected to the first side edge and the second side edge respectively and are capable of moving synchronously along the first side edge and the second side edge. The infrared light receiving element bracket includes a detection platform arranged in the second direction above the surface of the substrate on which the alignment film is provided, the multiple infrared light receiving elements are arranged sequentially on the detection platform, and two ends of the detection platform are connected to the first side edge and the second side edge respectively and are capable of moving synchronously along the first side edge and the second side edge.

Optionally, the infrared light emitting element bracket and the infrared light receiving element bracket move synchronously.

Optionally, the infrared imaging unit is further configured to, emit the infrared light beams vertically toward the surface of the substrate on which the alignment film is provided, and collect the infrared light beams reflected by the surface of the substrate on which the alignment film is provided so as to form the infrared thermogram.

Optionally, the infrared imaging unit includes an infrared light source, a beam splitter, a light filter, a controllable lens, a reflector and an infrared detector. The infrared light source is used to emit infrared light beams vertically toward the surface of the substrate on which the alignment film is provided. The infrared light beams from the infrared light source pass through a transmission surface of the beam splitter and the light filter and arrive at the surface of the substrate on which the alignment film is provided. The infrared light beams reflected by the surface of the substrate on which the alignment film is provided pass through the controllable lens and the light filter and arrive at a reflection surface of the beam splitter. The infrared light beams are reflected by the reflection surface of the beam splitter toward the reflector, and then are reflected by the reflector toward the infrared detector, so as to generate the infrared thermogram. The light filter is used to filter out light beams other than the infrared light beams.

Optionally, the infrared imaging unit further includes a controllable grating and a retarder. The controllable lens is arranged between the light filter and the surface of the substrate on which the alignment film is provided and is used to regulate a focus length. The controllable grating is arranged between the reflection surface of the beam splitter and the reflector. The retarder is arranged between the controllable grating and the reflector and used to retard the infrared light beams reflected by the reflection surface of the beam splitter toward the infrared detector, so as to regulate a time sequence of the infrared light beams detected by the infrared detector.

Optionally, the substrate includes a first side edge and a second side edge each extending in a first direction and a third side edge and a fourth side edge each extending in a second direction perpendicular to the first direction. The rubbing mura detection device further includes a guide rail arranged in the second direction above the surface of the substrate on which the alignment film is provided, and a driving mechanism used to drive the guide rail to move in the first direction and drive the infrared imaging unit to move along the guide rail.

Optionally, the rubbing mura detection device further includes a position sensor configured to detect a position of the guide rail, and to send, in the case that a projection of the guide rail onto a plane where the substrate is located is not located within a region where the substrate is located, a prompt signal to the driving mechanism.

Optionally, the rubbing mura detection device further includes a three-dimensional scanning mechanism configured to carry the infrared imaging unit and control the infrared imaging unit to traverse all positions above the surface of the substrate on which the alignment film is provided.

As compared with the related art, the rubbing mura detection device in the embodiments of the present disclosure may detect the rubbing mura in accordance with the acquired passive infrared image of the rubbing mura, and the passive infrared image may be acquired in an effective manner, so it is able to overcome the drawbacks caused by the inhomogeneity of water beads in the steam-based detection approach. In addition, the rubbing mura shown by the infrared image may be tiny, and at this time the infrared image is stored in the form of radiation temperature data. Brightness temperature value comparisons are performed on the temperature data, so as to determine, in accordance with a temperature difference, a position of a rubbing alignment abnormality. Then, a profile image of the position is obtained using an ultrasonic wave, and a type of the abnormality is determined in accordance with the profile image. As a result, it is able to adjust the rubbing alignment process in accordance with the type of the abnormality, thereby preventing the occurrence of the abnormality.

DETAILED DESCRIPTION OF THE EMBODIMENTS

Technical solutions in the present disclosure will be described hereinafter in a clear and complete manner in conjunction with the drawings and embodiments. Obviously, the following embodiments merely relate to a part of, rather than all of, the embodiments of the present disclosure, and based on these disclosed embodiments, a person skilled in the art may, without any creative effort, obtain other embodiments, which also fall within the scope of the present disclosure.

Figure 1:
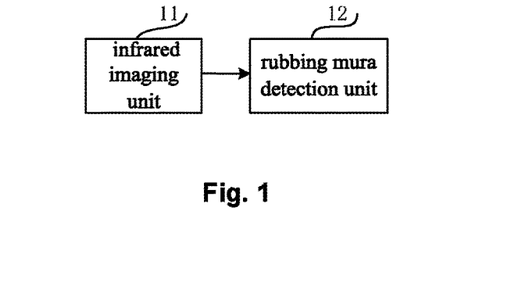
FIG. 1 is a block diagram of a rubbing mura detection device according to some embodiments of the present disclosure.

The present disclosure provides in some embodiments a rubbing mura detection device which, as shown in FIG. 1, includes an infrared imaging unit 11 used to acquire an infrared thermogram of a surface of the substrate, on which the alignment film is provided; and a rubbing mura detection unit 12 connected to the infrared imaging unit 11 and used to detect whether or not the alignment film has a rubbing mura in accordance with an infrared radiation brightness temperature distribution in the infrared thermogram.

According to the rubbing mura detection device in the embodiments of the present disclosure, it may detect the rubbing mura in accordance with the acquired passive infrared image of the rubbing mura, and the passive infrared image may be acquired in an effective manner, so it is able to overcome the drawbacks caused by the inhomogeneity of water beads in the steam-based detection approach. In addition, the rubbing mura shown by the infrared image may be tiny, and at this time the infrared image is stored in the form of radiation temperature data. Brightness temperature value comparisons are performed on the temperature data, so as to determine, in accordance with a temperature difference, a position of a rubbing alignment abnormality. Then, a profile image of the position is obtained using an ultrasonic wave, and a type of the abnormality is determined in accordance with the profile image. As a result, it is able to adjust the rubbing alignment process in accordance with the type of the abnormality, thereby preventing the occurrence of the abnormality.

A working principle of an infrared photoelectric sensing array will be described hereinafter. Infrared radiation may be detected and measured by a photoelectric device, and a correspondence may be established between the infrared radiation and a surface temperature. Any object having a temperature above absolute zero (−273° C.) may emit infrared radiation. The infrared radiation from a to-be-detected object may be received by the infrared photoelectric sensing array via an infrared detector and an optical imaging objective lens, and the energy distribution of the infrared radiation may then be measured by a photosensitive element of the infrared detector, so as to acquire an infrared thermogram corresponding to a thermal field of a surface of the object. Generally speaking, the infrared photoelectric sensing array is used to convert invisible infrared energy from the object into a visible thermogram, in which different colors represent different temperatures of the to-be-detected object.

The infrared imaging unit may include an infrared light source used to emit infrared light beams toward the surface of the substrate on which the alignment film is provided, and an imaging unit used to generate the infrared thermogram in accordance with infrared light beams which are reflected by the surface and are collected.

Optionally, the substrate includes a first side edge and a second side edge each extending in a first direction and a third side edge and a fourth side edge each extending in a second direction perpendicular to the first direction. The infrared light source includes multiple infrared light emitting elements used to emit the infrared light beams at a predetermined angle toward the surface of the substrate on which the alignment film is provided. The imaging unit includes multiple infrared light receiving elements used to receive the infrared light beams reflected by the surface, so as to form the infrared thermogram. The multiple infrared light emitting elements are arranged above the surface of the substrate on which the alignment film is provided in the second direction and are capable of moving synchronously in the first direction. The multiple infrared light receiving units are arranged above the surface of the substrate on which the alignment film is provided in the second direction and are capable of moving synchronously in the first direction.

In the embodiments of the present disclosure, the infrared imaging unit includes the infrared light source used to emit the infrared light beams toward the surface of the substrate where the alignment film is provided, and the imaging unit used to generate the infrared thermogram in accordance with the infrared light beams which are reflected by the surface and are collected. In addition, the multiple infrared light emitting elements and the multiple infrared light receiving elements are respectively arranged above the surface of the substrate where the alignment film is provided in the second direction and are both capable of moving synchronously in the first direction. In this way, it is able to acquire the infrared thermogram of the rubbing mura at any position on the alignment film by moving the infrared light emitting elements and the infrared light receiving elements.

Optionally, the rubbing mura detection device further includes an infrared light emitting element bracket capable of moving along the first side edge and the second side edge, and an infrared light receiving element bracket capable of moving along the first side edge and the second side edge.

The infrared light emitting element bracket includes a beam arranged in the second direction above the surface of the substrate where the alignment film is provided, the multiple infrared light emitting elements are arranged sequentially on the beam, and two ends of the beam are connected to the first side edge and the second side edge respectively and are capable of moving synchronously along the first side edge and the second side edge.

The infrared light receiving element bracket includes a detection platform arranged in the second direction above the surface of the substrate where the alignment film is provided, the multiple infrared light receiving elements are arranged sequentially on the detection platform, and two ends of the detection platform are connected to the first side edge and the second side edge respectively and are capable of moving synchronously along the first side edge and the second side edge.

Each infrared light receiving unit includes a lens facing the surface of the substrate where the alignment film is provided, so as to receive the infrared light beams reflected by the surface of the substrate where the alignment film is provided.

Optionally, the infrared light emitting element bracket and the infrared light receiving element bracket move synchronously. In this way, it is able to ensure that the infrared light beams emitted by the infrared light emitting elements and reflected by the surface of the substrate where the alignment film is provided can be received by the infrared light receiving elements.

In the rubbing mura detection device according to the embodiments, the multiple infrared receiving elements and the multiple infrared light emitting elements may be arranged in an array form. In addition, multiple ultrasonic probes may be arranged in an array form above the surface of the substrate where the alignment film is provided, so as to detect the rubbing mura on the alignment film and acquire a two-dimensional profile of the rubbing mura. Based on the surface profile of the rubbing mura on the alignment film, a signal processing parameter may be calculated using a function of a position of the ultrasonic probe, so as to correct the infrared light beam distortions of the reflected infrared pulses. In some embodiments, ultrasonic waves are transmitted each time by merely one ultrasonic wave transmitting probe in an array of multiple elements, and waveforms of the ultrasonic waves reflected by a corresponding element in the array and received by one ultrasonic wave receiving probe corresponding to the ultrasonic wave transmitting probe may be recorded, so as to scan the rubbing mura on the alignment film. The transmission of the ultrasonic waves and the reception of the reflected ultrasonic waves are performed in a similar way by each pair of ultrasonic wave transmitting probe and ultrasonic wave receiving probe in the array, so that the ultrasonic data in a resultant and complete data set corresponds to positions of respective groups of the ultrasonic wave transmitting probes and the ultrasonic wave receiving probes. Then, the surface profile of the rubbing mura on the alignment film may be measured in accordance with the probe array corresponding to the ultrasonic waveform data. Next, based on the measured surface profile, the signal processing parameter for correcting the uneven surface is calculated using the function of the probe position (the ultrasonic wave transmitting probes and the ultrasonic wave receiving probes are arranged on a movable frame above the substrate), and the infrared light beam distortion of a signal reflected by the interior of the rubbing mura (i.e., the reflected infrared light beams) is removed. The signal processing parameter may be changed by a receiving array consisting of the ultrasonic wave receiving probes through encoding the function of the probe positions, so as to analyze (check) the interior of the rubbing mura in accordance with the reflected signal. In a preferred embodiment of the present disclosure, a synthetic aperture focusing technique (SAFT) may be used to form a two-dimensional aperture desired for three-dimensional point focusing, so as to improve the sensitivity and the accuracy. Because the waveforms from all the elements have been stored, so the SAFT may be conveniently applied to a matrix-based transmitting/focusing scheme. Next, the waveforms received by the multiple probes may be focused so as to conveniently acquire an effect of the SAFT.

In an embodiment, the rubbing mura on the alignment film may be scanned, and then the two-dimensional surface profile of the rubbing mura may be measured by encoding the function of the probe position using a mechanical scriber, a laser-based technique, an infrared thermal wave testing technique or the like. Based on the measured surface profile, the signal processing parameters may be calculated using the function of the probe position. These signal processing parameters are used to correct the uneven surface, so as to remove the infrared light beam distortions of the reflected signals. Then, the signal processing parameters are transmitted to a commercial phased-array instrument connected to a two-dimensional infrared array transducer. Next, based on these signal processing parameters, the rubbing mura on the alignment film may be scanned by multiple infrared probes in an array. In this way, the signal processing parameters corresponding to the positions of the infrared probes in the array may be selected, and the infrared pulses reflected by the interior of the rubbing mura may be received, processed and recorded by the infrared probes.

The rubbing mura on the alignment film may be scanned through the above methods, so as to measure the surface profile. During the scanning, the infrared light beams are emitted by merely one of the infrared light emitting probes in the array. The infrared waveform reflected by each element in the array may be recorded, so as to acquire the data set corresponding the positions of the respective groups of the infrared light transmitting elements and the infrared light receiving elements. The data set includes the data about the infrared waves received by the respective infrared light receiving elements. The signal processing parameters may be calculated in accordance with the surface profile, and then the data set is processed using the latest signal processing parameters, so as to correct the irregular surface and remove the infrared light beam distortion of the signal reflected by the interior of the rubbing mura.

In the embodiments of the present disclosure, each probe may serve as a transmitter and a receiver at the same time, or one probe in a probe pair may serve as the transmitter while the other probe may serve as the receiver. In the case that two probes are used as the transmitter and the receiver respectively, it is able to reduce an amplitude of the light beam reflected by an interface between a liquid and the rubbing mura, and at this time, the system may be "blind" to the near-surface reflection from the interior of the rubbing mura. In the case that two probes are used as the transmitter and the receiver respectively, the calculation of the signal processing parameters is identical to the calculation of the signal processing parameters in the case that a single probe is used as the transmitter and the receiver simultaneously, but at this time, a relative position between the two probes needs to be taken into consideration. In this case, the probe as the transmitter may be operated in a pulse-echo manner (transmit and receive the infrared wave by an identical element in the probe) while the infrared wave reflected by the interior of the rubbing mura has been received by the probe as the receiver, so as to acquire the surface profile. The two probes are separated from each other laterally. The probe as the transmitter may transmit the infrared pulse toward the liquid and the rubbing mura and receive the ultrasonic wave reflected by the surface of the rubbing mura, so as to detect the surface profile of the rubbing mura. The probe as the receiver may receive the ultrasonic wave reflected by the interior of the rubbing mura. The data may be processed using the above-mentioned methods, so as to create an image equivalent to the ultrasonic waves focused at each point within a region of interest. In addition, the data from various numbers of elements may be processed, so as to effectively change the aperture, thereby detecting the rubbing mura occupying different sizes of regions. For example, the effective aperture may increase along with an increase in a focus distance, so as to maintain a constant focus width for a detected region. The focus width may be calculated using the following equation: focus width=(focus distance)*(wavelength of an infrared wave)/(effective probe width).

The surface profile of the rubbing mura on the alignment film may be accurately measured by the infrared probe array. To be specific, the data about the reflected infrared light beams may be collected while the rubbing mura is scanned with the infrared light beams at angles, and in the case that the profile of a part of the surface has been considered to be created accurately, the infrared light beam at a known angle may be combined with the position of the probe so as to match the collected data. In the case that the infrared light beam is perpendicular to the surface, it is able to acquire a maximum reflected infrared light beam from a corresponding point on the surface. In the case that the infrared light beams at various angles and the corresponding probe positions have been combined, the infrared light beam reflected by a given point on the surface and having the largest amplitude may be used to measure a distance between the probe and the given point. Then, a position of the given point may be determined in accordance with the corresponding probe position and the corresponding angle of the infrared light beam. Through measuring the positions of all the points, it is able to determine the entire surface profile of the rubbing mura. In order to acquire the entire surface profile, the infrared light beams are transmitted at various angles, and the collected signals may show amplitude information and time information about peak signals of the infrared light beams at various angles corresponding to the probe positions.

During the actual application, the infrared imaging unit is used to emit the infrared light beams vertically toward the surface of the substrate where the alignment film is provided, and collect the infrared light beams reflected by the surface so as to form the infrared thermogram.

The infrared imaging unit may include an infrared light source, a beam splitter, a light filter, a controllable lens, a reflector and an infrared detector. The infrared light source is used to emit infrared light beams vertically toward the surface of the substrate where the alignment film is provided. The infrared light beams from the infrared light source pass through a transmission surface of the beam splitter and the light filter and arrive at the surface of the substrate where the alignment film is provided. The infrared light beams reflected by the surface pass through the controllable lens and the light filter and arrive at a reflection surface of the beam splitter. The infrared light beams are reflected by the reflection surface of the beam splitter toward the reflector, and then are reflected by the reflector toward the infrared detector, so as to generate the infrared thermogram. The light filter is used to filter out light beams other than the infrared light beams.

Optionally, the infrared imaging unit further includes a controllable grating and a retarder. The controllable lens is arranged between the light filter and the surface of the substrate where the alignment film is provided and used to regulate a focus length. The controllable grating is arranged between the reflection surface of the beam splitter and the reflector. The retarder is arranged between the controllable grating and the reflector and used to retard the infrared light beams reflected by the reflection surface of the beam splitter toward the infrared detector, so as to regulate a time sequence of the infrared light beams detected by the infrared detector.

The substrate includes a first side edge and a second side edge each extending in a first direction and a third side edge and a fourth side edge each extending in a second direction perpendicular to the first direction. The rubbing mura detection device further includes a guide rail arranged in the second direction above the surface of the substrate where the alignment film is provided; and a driving mechanism used to drive the guide rail to move in the first direction and drive the infrared imaging unit to move along the guide rail.

The rubbing mura detection device may further include a position sensor used to, detect a position of the guide rail, and to send, in the case that a projection of the guide rail onto a plane where the substrate is located is not located within a region where the substrate is located, a prompt signal to the driving mechanism.

The infrared imaging unit of the rubbing mura detection device will be described hereinafter in more details.

Figure 2:
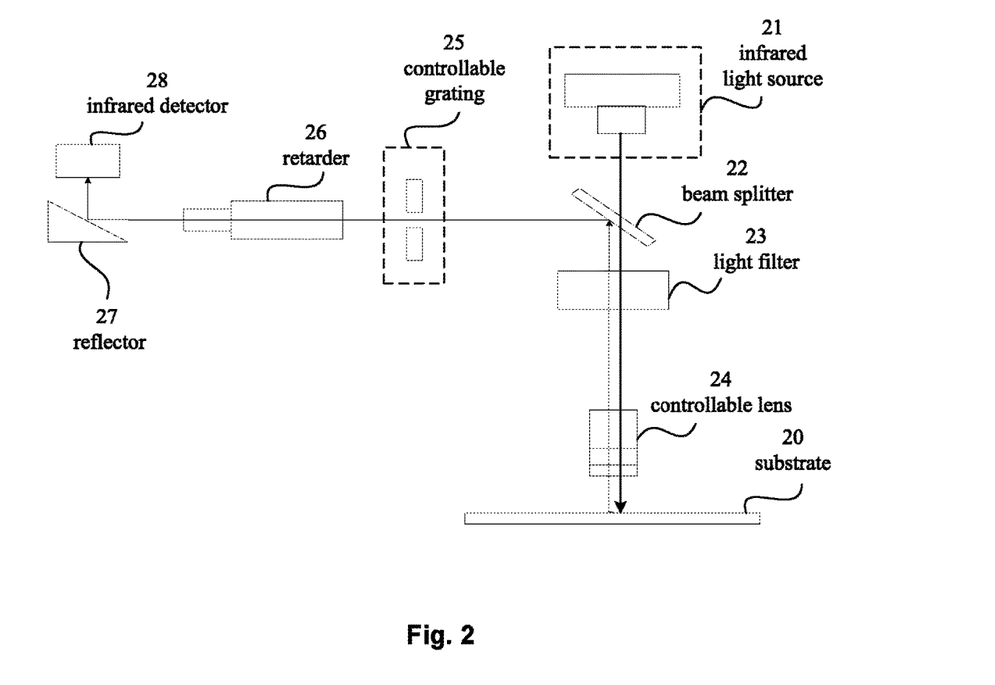
FIG. 2 is a schematic view showing an infrared imaging unit of a rubbing mura detection device according to some embodiments of the present disclosure.

As shown in FIG. 2, according to some embodiments of the present disclosure, the infrared imaging unit includes an infrared light source 21, a beam splitter 22, a light filter 23, a controllable lens 24, a controllable grating 25, a retarder 26, a reflector 27 and an infrared detector 28.

The infrared light source 21 is used to emit infrared light beams vertically toward the surface of the substrate 20 where the alignment film is provided. The infrared light beams from the infrared light source 21 pass through a transmission surface of the beam splitter 22 and the light filter 23 and arrive at the surface of the substrate 20 where the alignment film is provided. The infrared light beams reflected by the surface of the substrate where the alignment film is provided pass through the controllable lens 24 and the light filter 23 and arrive at a reflection surface of the beam splitter 22. The infrared light beams are reflected by the reflection surface of the beam splitter 22 toward the reflector 27, and then are reflected by the reflector 27 toward the infrared detector, so as to generate the infrared thermogram. The light filter 23 is used to filter out light beams other than the infrared light beams. The controllable lens 24 is arranged between the light filter 23 and the surface of the substrate 20 where the alignment film is provided, and is used to regulate a focus length. The controllable grating 25 is arranged between the reflection surface of the beam splitter 22 and the reflector 27. The retarder 26 is arranged between the controllable grating 25 and the reflector 27 and used to retard the infrared light beams reflected by the reflection surface of the beam splitter 22 toward the infrared detector 28, so as to regulate a time sequence of the infrared light beams detected by the infrared detector 28.

The infrared imaging unit in FIG. 2 is actually a passive infrared camera tube, which further includes a collimator for collimating the infrared light beams from the infrared light source 21, thereby acquiring the stable and uniform reference light beams. The collimated reference light beams are directed toward the infrared detector or directed to the infrared detector via the beam splitter. For example, the collimator may include a lens group and a reflector group. The infrared light beams from the infrared light source 21 may be converged by the lens group. The converged infrared light beams may be folded by the reflector group, and the folded infrared light beams are directed to the infrared detector, or are directed to the infrared detector via the beam splitter. By folding the infrared light beams with the reflector group, it is able to remarkably reduce a spatial distance between the infrared light source and the infrared detector, thereby reducing a size of the infrared imaging unit.

According to the infrared imaging unit, the infrared light beams reflected by the surface of the substrate where the alignment film is provided are directed toward the infrared detector. For example, the infrared light beams may be converged by the lens group and then directed to the infrared detector.

Optionally, the rubbing mura detection device further includes a three-dimensional scanning platform for carrying the infrared imaging unit, so as to enable the infrared imaging unit to traverse all positions above the surface of the substrate where the alignment film is provided.

The three-dimensional scanning platform includes an azimuth scanning mechanism and an elevation scanning mechanism, and the infrared imaging unit is a quick-response contactless infrared thermometer. The rubbing mura detection device further includes a controller, and the controller includes a step motor driver that meets the requirement of a step motor, a programmable logic controller (PLC) and an interface chip. The three-dimensional scanning platform may drive, under the control of the controller and a microprocessor used for controlling and data acquisition, the quick-response contactless infrared thermometer to stereoscopically scan a color filter substrate or an array substrate, and store the measured infrared brightness temperature values within the microprocessor. After the scanning, the infrared brightness temperature values corresponding to different positions are combined to from the infrared brightness temperature distribution of the color filter substrate or the array substrate. Then, the ultrasonic waves are transmitted to the position where the abnormality occurs in the infrared thermogram so as to acquire the surface profile.

According to some embodiments of the present disclosure, the rubbing mura detection device further includes a support mechanism for supporting the to-be-detected substrate. The support mechanism includes two support bars arranged parallel to each other, and support legs arranged between the support bars for fixing and supporting the to-be-detected substrate. In use, the substrate is placed onto the support legs, the infrared imaging unit moves along a movable bracket, and the movable bracket moves along the supporting bars. In this way, the infrared imaging unit may move to any positions above the to-be-detected substrate, so as to acquire the image of the rubbing mura.

In the case that the support legs are used, the light beams from the light source may be shielded by the support legs, so shadows may occur on the substrate. In order to prevent the measurement result from being adversely affected by the shadows, the support legs may be made of transparent organic glass having an excellent light transmission property. In order to firmly support the to-be-detected substrate, the more support legs, the better; while determination of the number of the support legs should take the saving of material and the convenience in mounting the substrate onto the support legs into consideration. Taking the substrate for a sixth-generation production line as an example, four support rods may be arranged in a short-edge direction of the substrate, and each support rod is provided with six support legs. Each support leg is hollow, has a diameter of several millimeters, and is provided at its upper end with a suction disc for vacuum adsorption. The support rods are each made of transparent organic glass. Although parts of the light beams from the light source are shielded, the detection of the rubbing mura may not be significantly affected due to the sufficient intervals of the four support rods. In addition, the substrate may be picked or placed conveniently by a mechanical arm due to intervals between the adjacent support rods.

Figure 3A:
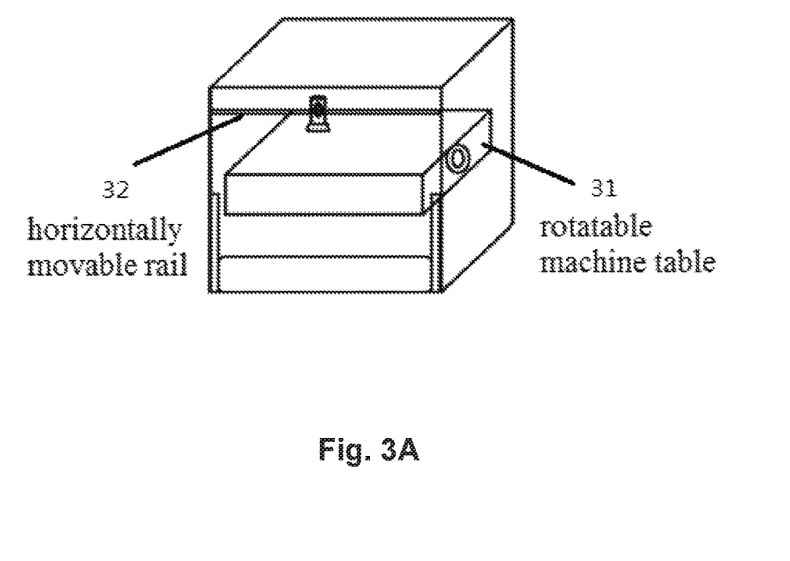
FIG. 3A is a schematic view showing a rubbing mura detection device according to some embodiments of the present disclosure.
Figure 3B:
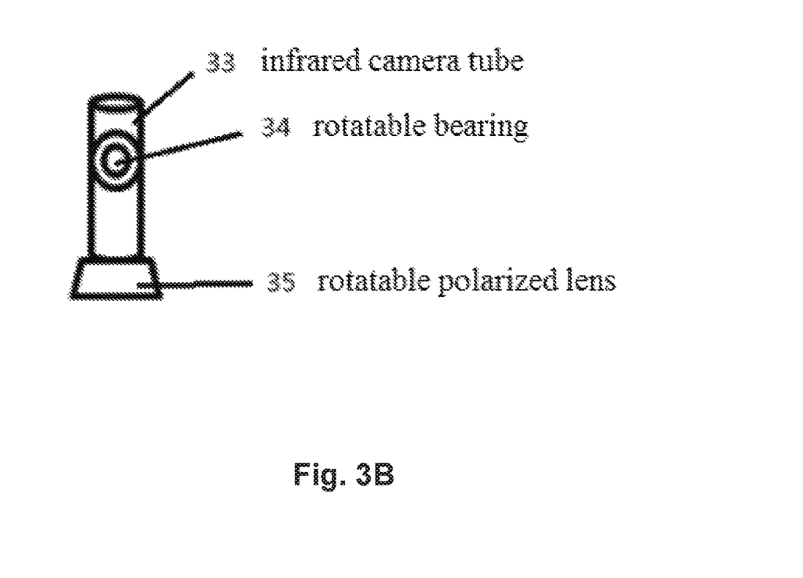
FIG. 3B is a schematic view showing a part of the rubbing mura detection device in FIG. 3A according to some embodiments of the present disclosure.

In an embodiment, as shown in FIGS. 3A and 3B, the rubbing mura detection device includes a rotatable machine table 31 for carrying the substrate, a horizontally movable rail 32, and an infrared camera tube 33. The horizontally movable rail 32 extends in a first direction and is capable of moving in a second direction perpendicular to the first direction. The infrared camera tube 33 is arranged on the horizontally movable rail 32 through a rotatable bearing 34.

A rotatable polarized lens 35 is further arranged on the infrared camera tube 33, and the infrared camera tube 33 may move along the horizontally movable rail 32. To be specific, the infrared camera tube 33 may along the horizontally movable rail 32 and the horizontally movable rail 32 may move in the second direction, so as to acquire the infrared image of the entire surface of the substrate where the alignment film is provided.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A rubbing mura detection device for detecting rubbing mura of an alignment film on a substrate, comprising:
    an infrared imaging unit configured to acquire an infrared thermogram of a surface of the substrate, on which the alignment film is provided; and
    a rubbing mura detection unit configured to detect whether or not the alignment film has the rubbing mura in accordance with an infrared radiation brightness temperature distribution in the infrared thermogram,
    wherein the infrared imaging unit is configured to, emit the infrared light beams vertically toward the surface of the substrate on which the alignment film is provided, and collect the infrared light beams reflected by the surface of the substrate on which the alignment film is provided so as to form the infrared thermogram,
    wherein the infrared imaging unit comprises an infrared light source and an imaging unit, wherein the imaging unit comprises a beam splitter, a light filter, a controllable lens, a reflector and an infrared detector; the infrared light source is configured to emit infrared light beams vertically toward the surface of the substrate on which the alignment film is provided; the infrared light beams from the infrared light source pass through a transmission surface of the beam splitter and the light filter and arrive at the surface of the substrate on which the alignment film is provided; the infrared light beams reflected by the surface of the substrate on which the alignment film is provided pass through the controllable lens and the light filter and arrive at a reflection surface of the beam splitter; and the infrared light beams are reflected by the reflection surface of the beam splitter toward the reflector and then are reflected by the reflector toward the infrared detector, so as to generate the infrared thermogram; and the light filter is configured to filter out light beams other than the infrared light beams,
    wherein the infrared imaging unit further comprises a controllable grating and a retarder; the controllable lens is arranged between the light filter and the surface of the substrate on which the alignment film is provided, and is configured to regulate a focus length; the controllable grating is arranged between the reflection surface of the beam splitter and the reflector; and the retarder is arranged between the controllable grating and the reflector and configured to retard the infrared light beams reflected by the reflection surface of the beam splitter toward the infrared detector, so as to regulate a time sequence of the infrared light beams detected by the infrared detector.

2. The rubbing mura detection device according to claim 1, wherein the infrared light source is configured to emit infrared light beams toward the surface of the substrate on which the alignment film is provided, and the imaging unit is configured to generate the infrared thermogram in accordance with collected infrared light beams which are reflected by the surface of the substrate on which the alignment film is provided.

3. The rubbing mura detection device according to claim 2, wherein the substrate comprises a first side edge and a second side edge each extending in a first direction, and a third side edge and a fourth side edge each extending in a second direction perpendicular to the first direction;

the infrared light source comprises a plurality of infrared light emitting elements configured to emit, at predetermined angles, the infrared light beams toward the surface of the substrate on which the alignment film is provided;

the imaging unit comprises a plurality of infrared light receiving elements configured to receive the infrared light beams reflected by the surface of the substrate on which the alignment film is provided, to form the infrared thermogram;

the plurality of infrared light emitting elements is arranged in the second direction above the surface of the substrate on which the alignment film is provided and is capable of moving synchronously in the first direction; and the plurality of infrared light receiving units is arranged in the second direction above the surface of the substrate on which the alignment film is provided and is capable of moving synchronously in the first direction.

4. The rubbing mura detection device according to claim 3, wherein each infrared light receiving unit comprises a lens facing the surface of the substrate on which the alignment film is provided, so as to receive the infrared light beams reflected by the surface of the substrate on which the alignment film is provided.

5. The rubbing mura detection device according to claim 3, further comprising an infrared light emitting element bracket capable of moving along the first side edge and the second side edge, and an infrared light receiving element bracket capable of moving along the first side edge and the second side edge;

the infrared light emitting element bracket comprises a beam arranged in the second direction above the surface of the substrate on which the alignment film is provided, the plurality of infrared light emitting elements is arranged sequentially on the beam, and two ends of the beam are connected to the first side edge and the second side edge respectively and are capable of moving synchronously along the first side edge and the second side edge; and the infrared light receiving element bracket comprises a detection platform arranged in the second direction above the surface of the substrate on which the alignment film is provided, the plurality of infrared light receiving elements is arranged sequentially on the detection platform, and two ends of the detection platform are connected to the first side edge and the second side edge respectively and are capable of moving synchronously along the first side edge and the second side edge.

6. The rubbing mura detection device according to claim 5, wherein the infrared light emitting element bracket and the infrared light receiving element bracket move synchronously.

7. The rubbing mura detection device according to claim 1, wherein the substrate comprises a first side edge and a second side edge each extending in a first direction, and a third side edge and a fourth side edge each extending in a second direction perpendicular to the first direction; and the rubbing mura detection device further comprises a guide rail arranged in the second direction above the surface of the substrate on which the alignment film is provided, and a driving mechanism configured to drive the guide rail to move in the first direction and drive the infrared imaging unit to move along the guide rail.

8. The rubbing mura detection device according to claim 7, further comprising:

a position sensor configured to detect a position of the guide rail, and to send, in the case that a projection of the guide rail onto a plane where the substrate is located is not located within a region where the substrate is located, a prompt signal to the driving mechanism.

9. The rubbing mura detection device according to claim 8, further comprising a three-dimensional scanning mechanism configured to carry the infrared imaging unit and control the infrared imaging unit to traverse all positions above the surface of the substrate on which the alignment film is provided.

10. The rubbing mura detection device according to claim 1, further comprising a three-dimensional scanning mechanism configured to carry the infrared imaging unit and control the infrared imaging unit to traverse all positions above the surface of the substrate on which the alignment film is provided.

11. The rubbing mura detection device according to claim 1, further comprising a three-dimensional scanning mechanism configured to carry the infrared imaging unit and control the infrared imaging unit to traverse all positions above the surface of the substrate on which the alignment film is provided.

12. The rubbing mura detection device according to claim 7, further comprising a three-dimensional scanning mechanism configured to carry the infrared imaging unit and control the infrared imaging unit to traverse all positions above the surface of the substrate on which the alignment film is provided.

* * * * *